US012079359B2

(12) United States Patent
McCool et al.

(10) Patent No.: US 12,079,359 B2
(45) Date of Patent: Sep. 3, 2024

(54) CENTRALIZED PLATFORM FOR PROCESSING ARTIFACTS OF DISTRIBUTED ENTITIES

(71) Applicant: Trustworthy Company, San Francisco, CA (US)

(72) Inventors: Daniel McCool, Richmond, VA (US); Daniel Kushner, Novato, CA (US); Nathaniel Robinson, San Francisco, CA (US)

(73) Assignee: TRUSTWORTHY COMPANY, San Francisco, CA (US)

( * ) Notice: Subject to any disclaimer, the term of this patent is extended or adjusted under 35 U.S.C. 154(b) by 422 days.

(21) Appl. No.: 17/506,143

(22) Filed: Oct. 20, 2021

(65) Prior Publication Data

US 2023/0118782 A1 Apr. 20, 2023

(51) Int. Cl.
G06F 16/906 (2019.01)
G06F 21/62 (2013.01)
(52) U.S. Cl.
CPC ........ *G06F 21/6218* (2013.01); *G06F 16/906* (2019.01)

(58) Field of Classification Search
CPC ................................................... G06F 16/906
See application file for complete search history.

(56) References Cited

U.S. PATENT DOCUMENTS

2022/0076160 A1* 3/2022 Lloyd .................... G06F 3/061

* cited by examiner

*Primary Examiner* — Baoquoc N To
(74) *Attorney, Agent, or Firm* — Perkins Cole LLP

(57) ABSTRACT

Centralized artifacts systems and methods for processing artifacts of distributed entities are disclosed. The centralized artifacts system receives a set of artifact-input data associated with the artifacts of the distributed entities. An artifact suggestions generator can generate artifact hierarchies using the artifact-input data. Artifact hierarchies can include categorical containers, tile elements, artifact fields, and suggested task blocks. An artifact collection interface can display the artifact hierarchies to entities and receive, from the entities, a new set of artifact-input data associated with the completion of the artifact hierarchies. Using the new set of artifact-input data, the centralized artifacts system performs updates to the artifact hierarchies such as modifying the existing artifact hierarchies or generating new artifact hierarchies.

20 Claims, 10 Drawing Sheets

CENTRALIZED PLATFORM FOR PROCESSING ARTIFACTS OF DISTRIBUTED ENTITIES

BACKGROUND

Content such as identification (ID) cards, financial statements, insurance policy documents, property information, passwords, and other important information, documents, or files related to individuals or entities in a family are often scattered. For example, the father of a family may have tax return documents saved on cloud servers, while the mother has car insurance policy paperwork stored locally on her computer. Additionally, the mother may have passwords (e.g., bank account login information, video game account passwords of her kids) written on notes dispersed throughout the house (e.g., taped to a fridge, shelved on a cabinet), while the grandfather has will, trust, or estate documents stored in a safe in his apartment. As used herein, an "artifact" can refer to any digital or physical information, document(s), or file(s) associated with one or more individuals or entities within a group of people (e.g., a family, friend group, organization, team, company). The number of artifacts within a group can often exceed the hundreds or thousands, and some artifacts can require regular updates to be kept up to date. Moreover, it can often be unclear as to what artifacts could be useful for an entity to keep track of or what new artifacts the entity may not be aware of but could be useful to start storing in the present or future.

Figure 1:
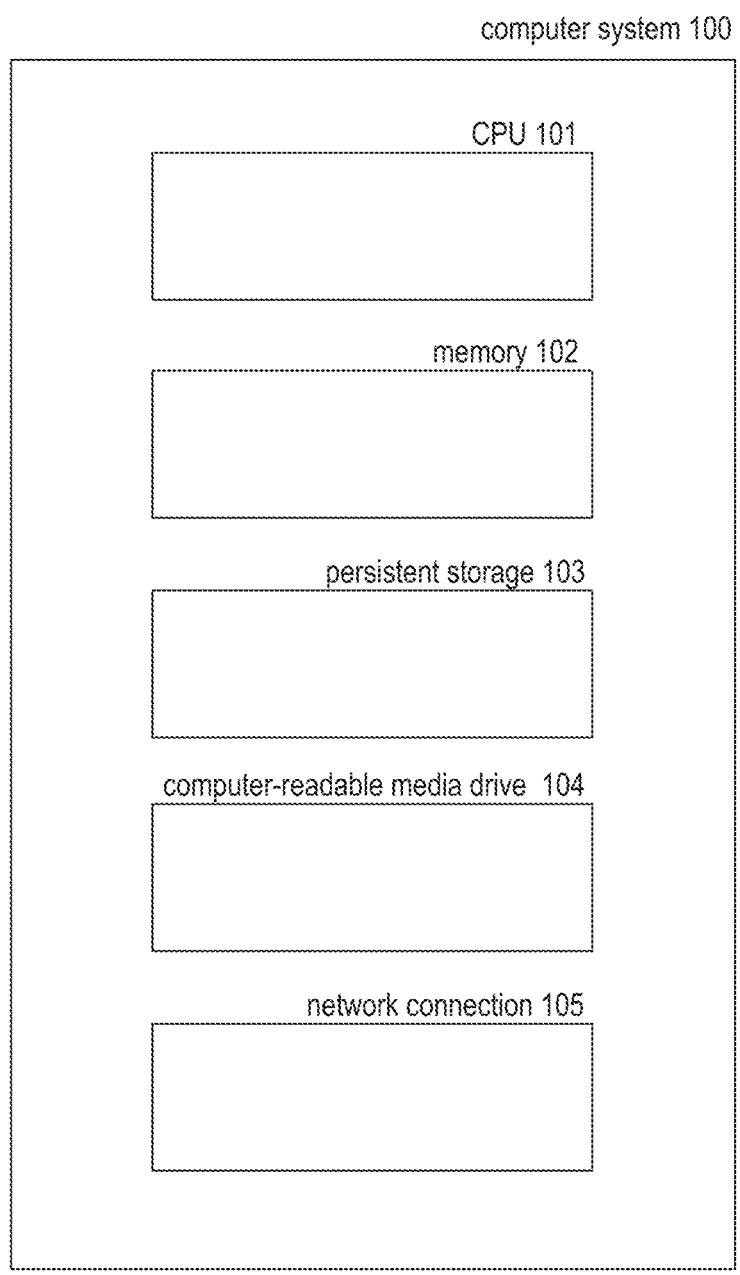
FIG. 1 is a block diagram showing some of the components typically incorporated in at least some of the computer systems and other devices on which the disclosed system operates in accordance with some implementations of the present technology.

In the drawings, some components and/or operations can be separated into different blocks or combined into a single block for discussion of some of the implementations of the present technology. Moreover, while the technology is amenable to various modifications and alternative forms, specific implementations have been shown by way of example in the drawings and are described in detail below. The intention, however, is not to limit the technology to the specific implementations described. On the contrary, the technology is intended to cover all modifications, equivalents, and alternatives falling within the scope of the technology as defined by the appended claims.

DETAILED DESCRIPTION

When artifacts are scattered across different places (e.g., files stored on computing systems in different regions, information managed on disparate platforms, documents filed physically in different areas) or distributed amongst multiple different entities (used herein as "distributed entities") or individuals (e.g., across different family, team, or group members/users), complications can arise as to how to effectively process, manage, and centralize such artifacts. These complications become especially exacerbated when entities are unsure as to what artifacts they have but are not keeping good track of, what artifacts they may not have but may need, or what artifacts they may need to update. For example, most individuals would struggle to list out the top fifty or hundred artifacts they have that are most important to keep track of, especially after those artifacts have been stored away for a long time and are not used on a day-to-day basis (e.g., wills, trusts, passwords, social security cards, birth certificates).

There is a need for methods and systems that can predict and suggest the specific artifacts an entity may benefit from keeping track of, may be missing, or may need to be updated. Moreover, when the number of artifacts and/or the number of entities the artifacts are associated with is high, processing and centralizing such artifacts becomes incredibly difficult, especially in a secure and fast manner. Conventional processes are unable to handle the growth in the number of artifacts distributed amongst several entities and the resulting complexity in having to process, centralize, and manage such artifacts. Most existing systems for storing artifacts are also not compatible with one-another (e.g., have different application programming interfaces) and typically focus on a single categorical container (e.g., only insurance, only financials, only passwords) managed by a single institution (e.g., bank servers, insurance agency servers, government servers). This can make centralization incredibly difficult and near impossible without effective processing methods.

To overcome these and other deficiencies of existing systems, the inventors have developed a centralized platform/system for processing artifacts of distributed entities (the "centralized artifacts system"). By examining the profile of individual entities and/or the relations between them within the set of distributed entities, the centralized artifacts system can generate suggestions of artifacts for entities to input or submit (e.g., fill-in fields or components of the artifact) so that the system can collect, process, and monitor the artifacts. For example, the centralized artifacts system can suggest artifacts related to each family member entity of a family and request submission or input, from the entities, of the suggested artifacts. The suggestions generated by the centralized artifacts system can include artifacts that entities already have but struggle to keep track of (e.g., many different passwords for different bank accounts, 529 plans created for several different kids in a family), new artifacts that entities do not currently have but would benefit from having (e.g., a power of attorney, a will), or artifacts that entities may need updates to (e.g., artifacts out of date, such as an expired license, or artifacts needing updates to comply with societal changes). Although the discussion herein is in the context of a family, the centralized artifacts system can apply to any group of individuals (e.g., team, company, group, organization).

In some instances, there can be inconsistent information across multiple different artifacts in multiple places (e.g., marital status, number of children). Such inconsistencies can be due to stale information or just mistakes made in one place. Existing systems and methods lack ways to address these inconsistencies. The centralized artifacts system, though, can deal with these inconsistencies by harmonizing the inconsistent information and ensuring that the information is accurate and consistent across various distributed systems. Moreover, propagating updates to all distributed systems can often be a challenge and is currently very difficult with the current methodologies. Individuals may not know all the places where information is stored (e.g., marital status or number of children stored separately at a bank server, government databases, local computer, insurance company server) and so they cannot then accurately update the information in all places (e.g., update the marital status or number of children at each of the places such information is stored). With the centralized artifacts system, universal updates across all distributed systems can be unnecessary due to consolidation of artifacts by the system and individuals can avoid having to keep track of all the places where information is stored. In some implementations, when universal updates are desirable, the centralized artifacts systems can automatically propagate all changes in one place to all other related places.

The centralized artifacts system can also integrate data of new entities that get added to the set of distributed entities. For example, when an entity gets married, the centralized artifacts system is able to identify that the spouse of the entity is a new entity. Subsequently, the centralized artifacts system can integrate any artifacts or data of the spousal entity. In some implementations, the centralized artifacts system can validate inputted data using an authorized source (e.g., validating driver's license information, vaccination records data, passport information etc.). This can provide benefits, over current systems, of keeping data validated, genuine, and authenticated. The centralized artifacts system can also keep artifacts secure in online databases and limit exposure to leaks. In various implementations, the centralized artifacts system can be integrated with other systems (e.g., email, travel itinerary websites, bank accounts, any platform that collects personal information). Accordingly, if an entity is, for example, planning a trip, the centralized artifacts system can flag that the entity's passport is expiring, the entity may need a visa to travel, or the entity may want to get a traveler's insurance policy. In contrast, current technologies lack ways to address the instances discussed above, while the centralized artifacts system addresses many of these shortcomings of existing systems and methods.

By aggregating and analyzing existing artifacts, the centralized artifacts system can assess whether new artifacts are needed and subsequently supply them or seek out those artifacts from third parties. For example, if the system detects that a user entity does not have a will, the centralized artifacts system can prompt the user entity to obtain a will, walk them through the process with a bespoke workflow, and then store the newly obtained will in databases. Such optimization can deliver immense value to user entities by putting artifacts and information to work for the user entity, rather than having such artifacts lying around and/or incomplete.

The centralized artifacts system can comprise (1) an artifact suggestions generator, (2) artifact hierarchies, and (3) an artifact collection interface. The artifact suggestions generator can generate and suggest categorical containers representing which category an artifact falls under, tile elements representing the artifact, artifact fields representing the individual fields or components that make up the artifact, and/or task blocks that collect inputs from entities to complete the artifact. Categorical containers can include, for example, identification information, financials, property information, insurance policies, taxes, passwords, estate documents, emergency plans, and/or family archives. Each categorical container can include a set of artifacts that fall under that category, and one or more artifacts can each be represented by a tile element. For example, a family identification information category may include tile elements such as a dad's ID, a mom's ID, a son's ID, etc. In some implementations, each categorical container can be setup as templates of tile elements that can be reused. Each tile element can subsequently include artifact fields that make-up and complete the artifact. For example, a tile element representing the dad's ID can include the dad's passport, driver's license, birth certificate, or social security number. The artifact suggestions generator can map the artifact fields or tile elements to suggested task blocks (e.g., suggested artifact fields to fill-in or complete, questions related to the artifact fields that require answers from entities, to-do lists to complete certain artifact fields or tile elements, automated notifications to fill-in the artifact fields for certain tile elements, automated reminders to update expiring information) for entities to submit inputs to and complete. The categorical containers, tile elements, artifact fields, and suggested task block thus make up a hierarchy (the "artifact hierarchies") representing the different abstraction levels or granularities of an artifact.

The artifact collection interface can receive or collect submissions or inputs from entities related to the completion of an artifact (used herein as "artifact input data"). These submissions or inputs can be in relation to the suggested task blocks that are generated by the artifact suggestions generator. For example, the artifacts suggestions generator can generate suggested task blocks that include questions, related to artifact fields of a health insurance policy artifact, such as "what is your health insurance provider", "please input your health insurance ID number", and "how many members are under your health insurance plan". The artifact collection interface can display these generated blocks to prompt a user entity for completion or input.

In response to receiving inputs, the artifact collection interface can collect the inputs from the user entity and utilize the submitted artifact input data to update the existing artifact hierarchies and/or generate new categorical containers, tile elements, artifact fields, or suggested task blocks. In other words, the centralized artifacts system is a feedback system that learns to update existing suggestions or generate new and better suggestions as more and more artifact input data is collected from responses to existing suggestions. For example, after receiving answers to the suggested task block related to the health insurance policy artifact, the artifact suggestions generator can generate new tile elements that may be relevant to the user entity such as dental insurance policy, vision care provider information, or a vaccination report. These new tile elements can help the user entity realize certain artifacts that may be important to keep track of, but he/she was not previously aware of. As another example, the artifact suggestions generator may also update an artifact field of the family member IDs to only include 4 family members after receiving submission from the user entity that the health insurance policy artifact was completed to include only 4 family members on the plan. As a further example, the artifact suggestions generator may update a real estate artifact, which can trigger a suggestion to add a mortgage and a homeowners insurance policy. By updating existing artifact hierarchies, the centralized artifacts system can improve the existing the suggestions provided.

In the following description, for the purposes of explanation, numerous specific details are set forth in order to provide a thorough understanding of implementations of the present technology. It will be apparent, however, to one skilled in the art that implementations of the present technology can be practiced without some of these specific details.

The phrases "in some implementations," "in several implementations," "according to some implementations," "in the implementations shown," "in other implementations," and the like generally mean the specific feature, structure, or characteristic following the phrase is included in at least one implementation of the present technology and can be included in more than one implementation. In addition, such phrases do not necessarily refer to the same implementations or different implementations.

Suitable Computing Environments

FIG. 1 is a block diagram showing some of the components typically incorporated in at least some of the computer systems and other devices on which the disclosed system operates. In various embodiments, these computer systems and other devices 100 can include server computer systems, desktop computer systems, laptop computer systems, netbooks, mobile phones, personal digital assistants, televisions, cameras, automobile computers, electronic media players, web services, mobile devices, watches, wearables, glasses, smartphones, tablets, smart displays, virtual reality devices, augmented reality devices, etc. In various embodiments, the computer systems and devices include zero or more of each of the following: a central processing unit (CPU) 101 or processor for executing computer programs; a computer memory 102 for storing programs and data while they are being used, including the facility and associated data, an operating system including a kernel, and device drivers; a persistent storage device 103, such as a hard drive or flash drive for persistently storing programs and data; computer-readable media drives 104 that are tangible storage means that do not include a transitory, propagating signal, such as a floppy, CD-ROM, or DVD drive, for reading programs and data stored on a computer-readable medium; and a network connection 105 for connecting the computer system to other computer systems to send and/or receive data, such as via the Internet or another network and its networking hardware, such as switches, routers, repeaters, electrical cables and optical fibers, light emitters and receivers, radio transmitters and receivers, and the like. While computer systems configured as described above are typically used to support the operation of the facility, those skilled in the art will appreciate that the facility may be implemented using devices of various types and configurations, and having various components.

Figure 2:
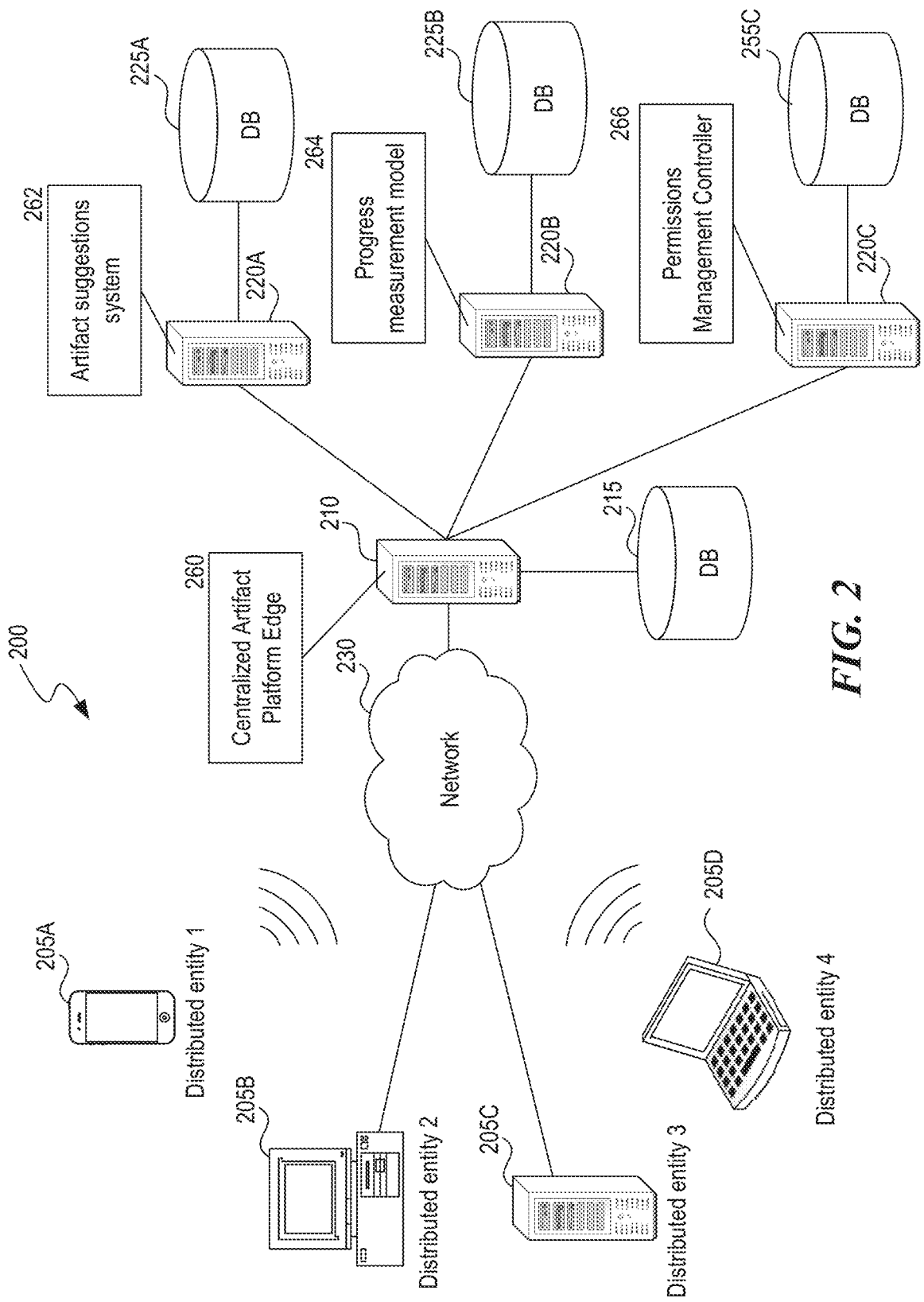
FIG. 2 is a system diagram illustrating an example of a computing environment in which the disclosed system operates in some implementations of the present technology.

FIG. 2 is a system diagram illustrating an example of a computing environment in which the disclosed system operates in some embodiments. In some embodiments, environment 200 includes one or more client computing devices 205A-D, examples of which can host the system 100. For example, the computing devices 205A-D can comprise distributed entities 1-4, respectively. Client computing devices 205 operate in a networked environment using logical connections through network 230 to one or more remote computers, such as a server computing device.

In some embodiments, server 210 is an edge server which receives client requests and coordinates fulfillment of those requests through other servers, such as servers 220A-C. For example, the server 210 can comprise a centralized artifact platform edge that receives client requests from the distributed entities 1-4 and coordinates fulfillment of those requests through servers 220A-C, which can comprise the centralized artifact system. The servers 220A-C can each comprise components of the centralized artifact system, such as an artifact suggestions system 262, a progress measurement model 264, and a permissions management controller 266. In some embodiments, server computing devices 210 and 220 comprise computing systems, such as the system 100. Though each server computing device 210 and 220 is displayed logically as a single server, server computing devices can each be a distributed computing environment encompassing multiple computing devices located at the same or at geographically disparate physical locations. In some embodiments, each server 220 corresponds to a group of servers.

Client computing devices 205 and server computing devices 210 and 220 can each act as a server or client to other server or client devices. In some embodiments, servers (210, 220A-C) connect to a corresponding database (215, 225A-C). As discussed above, each server 220 can correspond to a group of servers, and each of these servers can share a database or can have its own database. Databases 215 and 225 warehouse (e.g., store) information such as, artifacts, initialization data, artifact-input data, artifact hierarchies, categorical containers, tile elements, artifact fields, task block, modal blocks, to-do blocks, automated notification blocks, entity profile data, permissions data, progress metrics, participation levels, textual inputs, numerical inputs, documents, scanned documents that have undergone optical character recognition (OCR), file attachments, image data records, video data records, scanned files, biometrics, facial recognition data, data fetched/imported from other distributed systems, one or more machine learning models (described below), training data, validation data, test data, and so on.

The one or more machine learning models can include supervised learning models, unsupervised learning models, semi-supervised learning models, and/or reinforcement learning models. Examples of machine learning models suitable for use with the present technology include, but are not limited to: regression algorithms (e.g., ordinary least squares regression, linear regression, logistic regression, stepwise regression, multivariate adaptive regression splines, locally estimated scatterplot smoothing), instance-based algorithms (e.g., k-nearest neighbor, learning vector quantization, self-organizing map, locally weighted learning, support vector machines), regularization algorithms (e.g., ridge regression, least absolute shrinkage and selection operator, elastic net, least-angle regression), decision tree algorithms (e.g., classification and regression trees, Iterative Dichotomiser 3 (ID3), C4.5, C5.0, chi-squared automatic interaction detection, decision stump, M5, conditional decision trees), Bayesian algorithms (e.g., naïve Bayes, Gaussian naïve Bayes, multinomial naïve Bayes, averaged one-dependence estimators, Bayesian belief networks, Bayesian networks), clustering algorithms (e.g., k-means, k-medians, expectation maximization, hierarchical clustering), association rule learning algorithms (e.g., apriori algorithm, ECLAT algorithm), artificial neural networks (e.g., perceptron, multilayer perceptrons, back-propagation, stochastic gradient descent, Hopfield networks, radial basis function networks), deep learning algorithms (e.g., convolutional neural networks, recurrent neural networks, long short-term memory networks, stacked auto-encoders, deep Boltzmann machines, deep belief networks), dimensionality reduction algorithms (e.g., principle component analysis, principle component regression, partial least squares regression, Sammon mapping, multidimensional scaling, projection pursuit, discriminant analysis), time series forecasting algorithms (e.g., exponential smoothing, autoregressive models, autoregressive with exogenous input (ARX) models, autoregressive moving average (ARMA) models, autoregressive moving average with exogenous inputs (ARMAX) models, autoregressive integrated moving average (ARIMA) models, autoregressive conditional heteroskedasticity (ARCH) models), and ensemble algorithms (e.g., boosting, bootstrapped aggregation, AdaBoost, blending, stacking, gradient boosting machines, gradient boosted trees, random forest).

In various implementations, the one or more machine learning models can be trained on training data or a training set. The training data or training set can be created by generating pairs of features (e.g., feature vectors) and/or ground-truth labels/values based on any of the data stored in databases 215 and 225. During training, the machine learning models can be adjusted or modified by, e.g., adjusting or modifying model parameters, such as weights and/or biases, so as to minimize some error measure (e.g., a difference between a predicted value and an actual/ground-truth value) over the training data. The error measure can be evaluated using one or more loss functions. Examples of loss functions that can be used include cross-entropy loss, log loss, hinge loss, mean square error, quadratic loss, L2 loss, mean absolute loss, L1 loss, Huber loss, smooth mean absolute error, log-cosh loss, or quantile loss. The trained machine learning models can then be applied to test data or validation data (e.g., holdout dataset) to generate predictions (e.g., predicted values or labels). The test data or validation data can also come from data that is stored in databases 215 and 225 (e.g., unlabeled data to generate predictions for). In some implementations, the machine learning models can be retrained to further modify/adjust model parameters and improve model performance. The machine learning models can be retrained on existing and/or new training data, training data, or validation data so as to fine-tune the model parameters and yield a different error measure over the data (e.g., further minimization of the error, or to increase the error to prevent overfitting). More specifically, the model can be further adjusted or modified (e.g., fine-tuned model parameters such as weights and/or biases) so as to alter the yielded error measure. Such retraining can be performed iteratively whenever it is determined that adjustments or modifications to the machine learning models are desirable.

Though databases 215 and 225 are displayed logically as single units, databases 215 and 225 can each be a distributed computing environment encompassing multiple computing devices, can be located within their corresponding server, or can be located at the same or at geographically disparate physical locations.

Network 230 can be a local area network (LAN) or a wide area network (WAN), but can also be other wired or wireless networks. In some embodiments, network 230 is the Internet or some other public or private network. Client computing devices 205 are connected to network 230 through a network interface, such as by wired or wireless communication. While the connections between server 210 and servers 220 are shown as separate connections, these connections can be any kind of local, wide area, wired, or wireless network, including network 230 or a separate public or private network.

Centralized Artifacts System

Figure 3:
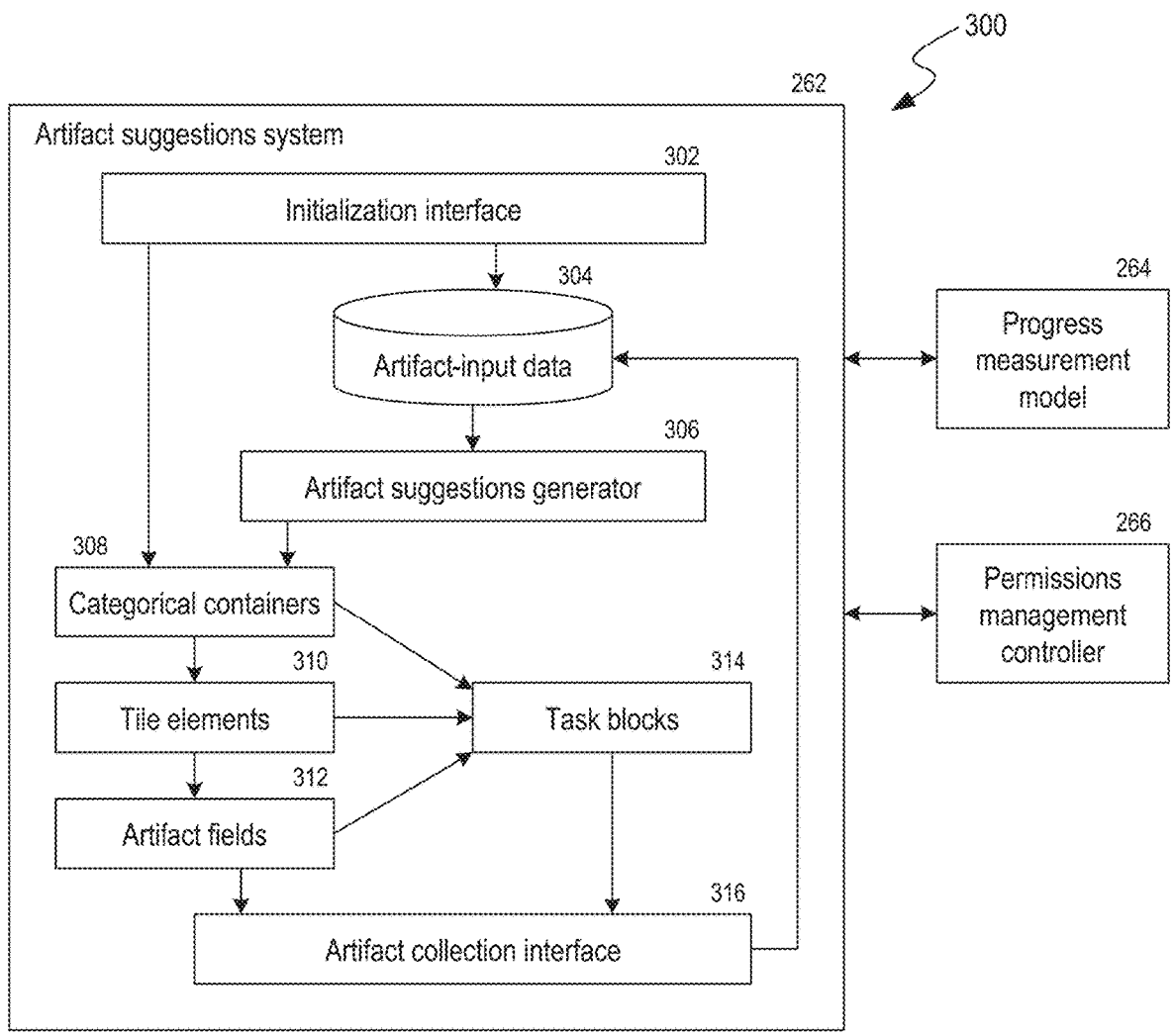
FIG. 3 is a block diagram illustrating components of a centralized artifacts system in accordance with some implementations of the present technology.

FIG. 3 is a block diagram illustrating components of the centralized artifacts system 300 in accordance with some implementations of the present technology. The centralized artifacts system can include the artifact suggestions system 262, the progress measurement model 264, and the permissions management controller 266.

The artifact suggestions system 262 can suggest relevant artifact hierarchies for user entities (e.g., one or more entities of a set of distributed entities) to submit inputs to and complete. For example, the artifact suggestions system 262 can suggest possible artifact categories, artifacts, or fields that may be relevant to user entities for submitting inputs to and completing. The artifact suggestions system 262 can include an initialization interface 302 for handling onboarding of user entities of the artifact suggestions system 262. The initialization interface 302 can generate and display an initial set of onboarding prompts or questions for user entities to complete. In response, user entities can submit inputs, to the initialization interface 302, to complete the initial set of onboarding prompts or questions. The initialization interface 302 can obtain the submitted inputs and store them as initialization data in the artifact-input data store 304. In some implementations, any artifact-input data that is stored in the artifact-input data store 304 can be a hash of the submitted inputs. Hashing enables increased security to protect the submitted inputs and user entity data. Due to the sensitive nature of family information, overcoming security and privacy concerns can be key. More details on the initialization data are described in relation to act 402 of FIG. 4.

Upon completion of initialization, an artifact suggestions generator 306, of the artifact suggestions system 262, can begin to generate suggestions using artifact-input data stored in the artifact-input data store 304 (e.g., initialization data or data received subsequently from an artifact collection interface 316). The artifact suggestions system 262 can generate suggested artifact hierarchies. The artifact hierarchies can represent the various abstraction levels or granularities of an artifact. For example, an artifact can be under a certain category (e.g., financial, insurance-related) and include several input fields that can be completed or filled-in by entities (e.g., a driver's license ID number, a date of birth). The artifact hierarchies can include categorical containers 308, tile elements 310, artifact fields 312, and/or task blocks 314. The artifact collection interface 316 can generate graphical or visual representations of the artifact hierarchies (e.g., GUI elements representing the categorical containers, tile elements, artifact fields, and task blocks) that prompt for inputs from user entities. User entities can thus then submit inputs to fill-in and complete the displayed artifact hierarchies.

The categorical containers 308 can categorize artifacts and include identification information, financials, property, insurance policies, taxes, passwords, estate documents, emergency plans, and/or family archives. For example, a will of entity A can be categorized under estate documents, while bank statements of entity B can be categorized under financials. In other words, the categorical containers 308 are containers or folders of artifacts that fall under the same category. The artifact suggestions system 262 can identify and suggest the categorical containers 308 that may be relevant to user entities.

Each categorical container can subsequently include a set of tile elements 310 that fall under the category of the container. Examples of tile elements, which can each correspond to one or more distributed entities, are: entity identification, pet identification (e.g., identification tile elements that are under the identification categorical container); checking account, savings account, investment account, retirement account, cryptocurrency, 401K account, emergency cash, credit card (e.g., financials tile elements that are under the financials categorical container); loan, home mortgage, family home information, car information, jewelry collection, artwork collection (e.g., property tile elements that are under the property categorical container); computer password, code to safe, WiFi password, garage door code, password manager (e.g., password tile elements that are under the passwords categorical container); life insurance, medical insurance, family medical information, car or auto insurance, homeowners insurance, umbrella insurance policy (e.g., insurance tile elements that are under the insurance policies categorical container); tax return (e.g., tax tile elements under the taxes categorical container); trust, will, power of attorney, medical directives (e.g., estate document tile elements that are under the estate documents categorical container); evacuation plan, go bag, fire extinguisher, letter (e.g., emergency plan tile elements that are under the emergency plans categorical container); family tree, baby photos, vacation photos, wedding album, or recital videos (e.g., family archive tile elements that are under the family archives categorical container).

The tile elements 310 can each include/encapsulate and correspond to one or more artifacts. A tile element can include or correspond to, for example, one or more: identification artifacts, mortgage artifacts, bank account artifacts, retirement account artifacts, bank card artifacts, loan artifacts, home artifacts, vehicle artifacts, jewelry artifacts, artwork artifacts, computer security artifacts, network security artifacts, password security artifacts, insurance artifacts, medical artifacts, tax return artifacts, trust artifacts, will artifacts, power of attorney artifacts, medical directives artifacts, evacuation plan artifacts, go-bag artifacts, fire extinguisher artifacts, letter artifacts, family tree artifacts, image artifacts, and/or video artifacts. In other words, a tile element can be a bin of related artifacts. As an example, a dad's identification information tile element, which can fall under the identification categorical container, can include identification artifacts such as the dad's social security information, driver's licenses, passports, or birth certificates. As another example, a family home tile element, which can fall under the property information categorical container, can include home artifacts such as mortgages, insurances, or loans. As a further example, a mom's checking account tile element, which can fall under the financials categorical container, can include the mom's checking account artifact.

Each of the tile elements 310 can further include artifact fields 312 that constitute the artifacts of the tile element. In particular, the artifact fields 312 are individual fields of information to be inputted or filled-in by user entities to complete an artifact. The artifact fields 312 are initially blank when generated but are completed when user entities fill-in or submit inputs into the artifact field. The types of user inputs that can complete an artifact field can include textual inputs, numerical inputs, documents, scanned documents that have undergone OCR performed by the centralized artifacts system, file attachments, image data records, video data records, scanned files, biometrics, facial recognition data, and/or data fetched/imported from other distributed systems. Examples of artifact fields are: first name, last name, birthday, profile photo, photo of identification, license number, identification number, passport number, passport county, identification expiration date, birth certificate, photo of birth certificate, social security, medical card, allergy information pet name, type of animal, pet insurance, additional files, notes (e.g., part of identification tile elements); account username, account password, master password, nickname, password file, password manager, additional files, notes (e.g., part of password tile elements); bank, account type, account holder, account number, routing number, nickname, issuing bank, card type card holder, expiration date, card number, security code, loan type, linked item, lender, wallet URL, access key, cash or debt, description, additional files, notes (e.g., part of financials tile elements); address, mortgage, insurance, make/model/year, loan, license plate number, vehicle identification number, photo, description, location, documentation, artist, brand, designer, additional files, notes, nickname (e.g., part of property tile elements); provider, persons insured, policy number, insurance type, end of term date, agent contact, employees, personal, photo of medical card, vehicles insured, what is covered, nickname, additional files, notes (e.g., part of insurance tile elements); lawyer contact, date created, location of original, upload of digital copy, nickname, notes (e.g., part of estate document tile elements); tax year, nickname, filing status, yes or no CPA used, CPA contact info, upload of digital copy, notes, additional files (e.g., part of tax tile elements); nickname, documents, equipment type location, recipient, author, letter, notes, additional files (e.g., part of the emergency plan tile elements); nickname, photos, videos, files, notes (e.g., part of the family archive tile elements); value of a car, home, or other property/item (e.g., can be fetched via an API from other systems, such as real estate marketplace platforms or car rating/valuation platforms) owned by user entities (e.g., valuation tile elements).

An artifact collection interface 316 can then display the artifact fields 312 to user entities, collect the inputted artifact fields from the user entities after they have viewed and filled-in the displayed artifact fields 312, and store the collected inputs in the artifact-input data store 304 as artifact-input data. As an example, a passport artifact, which can be encapsulated by an identification information tile element, can include artifact fields such as passport number, country issued, fingerprint, expiration date, and/or photo of passport. User entities can add the photo or input/fill-in the passport number, country issued, fingerprint, or expiration date to complete the passport artifact. The artifact collection interface 316 can then obtain the passport number, country issued, fingerprint, or expiration date and store them as artifact-input data in the artifact-input data store 304. As another example, a checking account artifact, which can be encapsulated by a checking account tile element, can include artifact fields such as account number, routing number, account type, and/or account holders. User entities can input/fill-in the account number, routing number, account type, and account holders to complete the checking account artifact. The artifact collection interface 316 can then obtain the account number, routing number, account type, or account holders and store them as artifact-input data in the artifact-input data store 304. In some implementations, when only a subset of the artifact fields is completed (e.g., just the passport number and country issued but not the expiration date), the artifact can be indicated as partially completed, while when all the artifact fields are completed, the artifact can be indicated as completed.

The artifact suggestions system 262 can also map the categorical containers 308, tile elements 310, and/or artifact fields 312 to task blocks 314 (or "suggested task blocks"). The task blocks 314 can be an additional granularity of the artifact hierarchies at which users can submit inputs to for completing an artifact. The types of user inputs that can complete a task block can include textual inputs, numerical inputs, documents, documents that have undergone OCR, file attachments, image data records, video data records, scanned files, biometrics, facial recognition data, or data fetched from other distributed systems integrated. Types of task blocks can include modal blocks, to-do blocks, and automated notification blocks. The task blocks 314 can be a queue of task blocks described more in detail below in relation to act 412 of FIG. 4.

Modal blocks can be prompts, related to the completion of one or more corresponding artifact fields, that require inputs from user entities. Each modal block can be mapped from one or more artifact fields, tile elements, or categorical containers. For example, a "car make and model" modal block, which maps from a car tile element or the car make and model artifact fields, can include a prompt "enter the make, model, and year of your car." In response, user entities can input the make, model, and year of the car. The artifact collection interface 316 can obtain the user inputs to the modal block and store them as artifact-input data in the artifact-input data store 304. In some instances, each tile element can include a series of modal blocks that complete the artifact fields of the tile element. The artifact suggestions system 262 can display the modal blocks in a series (e.g., screen by screen) and prompt completion of each block. When user entities complete a modal block of the series, the modal block is dequeued from the queue of task blocks and a transition to the next modal block in the series occurs. For example, after completion of the "car make and model" modal block, the artifact suggestions system 262 can transition to and display the "loan or lease" modal block. The "loan or lease" modal block can include a prompt "does this car have a loan or lease? enter no or select one or more inputs to link to this car." User entities can then submit inputs to the "loan or lease" modal block (e.g., by linking loan information from a bank server integrated with the artifact suggestions system 262), and the artifact suggestions system 262 can store the submitted input as artifact-input data to artifact-input data store 304.

To-do blocks can be a set of to-do items that form a to-do list. The artifact suggestions system 262 can suggest and display the to-do blocks as a to-do list of categorical containers, tile elements, and/or artifact fields that the user entity should consider and identify if there are any fields or tile elements to submit inputs to and complete. The artifact collection interface 316 can subsequently collect the submitted inputs as artifact-input data and store them in the artifact-input data store 304. In various instances, the artifact suggestions system 262 can generate multiple to-do lists, and each to-do list can include to-do blocks mapped from the same categorical containers or tile elements. For example, the artifact suggestions system 262 can suggest a to-do list mapped from the tax return tile element that includes to-do blocks: add tax year, upload digital copy of tax return from an integrated government database, and add certified public accountant name.

Automated notification blocks can be automated reminders for specific inputs generated by the artifact suggestions system 262. The automated notification blocks reminders can be mapped from categorical containers, tile elements, and/or artifact fields and can be reminders to user entities to submit inputs for the corresponding categorical containers, tile elements, and/or artifact fields. The artifact collection interface 316 can subsequently collect the submitted inputs as artifact-input data and store them in the artifact-input data store 304. As an example, the artifact suggestions system 262 can determine from other integrated systems (e.g., government servers, travel agency systems) that the user entity's passport information is going to be out of date soon. Upon that determination, the artifact suggestions system can map the passport information tile element or the passport number artifact field to an automated notification block that reminds the user entity regarding the passport issue. This automated notification block can notify the user entity that their passport is expiring soon, and he/she should input a new passport number when they renew the passport. The artifact collection interface 316 can then obtain the new passport number when inputted and store them in the artifact-input data store 304. As another example, the artifact suggestions system 262 can identify unsecure scenarios such as when the user entity's password information is the same across too many different personal accounts (e.g., bank account, insurance login site, cloud photos/image storage account) or has gone too long without being changed. In response, the artifact suggestions system can generate an automated notification block, mapped from the passwords categorical container, that suggests to the user entity to change their passwords across different accounts. The artifact collection interface 316 can then obtain the any new passwords when inputted and store them in the artifact-input data store 304. More details on the above-discussed task blocks are described below in relation to act 412 of FIG. 4.

In some implementations, the centralized artifacts system 300 can also include a progress measurement model 264. The progress measurement model 264 can determine the progress of the artifact suggestions system 262 by measuring the number or proportion of artifact hierarchies that have been completed thus far by user entities (e.g., number or proportion of completed tile elements, artifact fields, task blocks). In other words, the progress measurement model 264 can determine progress metrics such as the amount of tile elements, artifact fields, and/or task blocks that have been filled-in by the user entity. Upon determining the progress, the progress measurement model 264 can display the progress metrics as a progress meter or visual guide showing real-time completion to user entities. In some instances, the progress meter can be a graphical representation of the percentage of completed artifact hierarchies. For example, the progress meter can show the number of completed tile elements divided by the total number of tile elements generated by the artifact suggestions generator 306, the number of completed artifact fields divided by the total number of artifact fields generated by the artifact suggestions generator 306, and/or the number of completed task blocks divided by the total number of task blocks generated by the artifact suggestions generator 306. The progress meter can give user entities a sense of what artifacts they have completed thus far, and what artifacts they can do more work on. In some implementations, the progress measurement model 264 can provide feedback to the artifact suggestions system 262 as to the current progress thereof. The progress measurement model 264 can store progress metrics in the artifact-input data store 304, and the artifact suggestions generator 306 can subsequently use this data to know how far it has progressed and whether it should suggest more artifact hierarchies. When the progress is high, the artifact suggestions generator 306 can generate more artifact hierarchies for user entities to continue to complete. When the progress is low, the artifact suggestions generator 306 can generate fewer artifact hierarchies and wait for user entities to complete existing suggested artifact hierarchies. More details on progress metrics are described below in relation to acts 502-506 of FIG. 5.

In various implementations, the centralized artifacts system can further include a permissions management controller 266. The permissions management controller 266 can approve of and allow additional entities to be permitted to access artifact hierarchies of the artifact suggestions system 262. Moreover, the permissions management controller 266 can control what specific artifact hierarchies are certain entities allowed to submit inputs for and complete. In particular, the permissions management controller 266 can grant or assign different levels of access and permissions to each entity accessing artifact hierarchies of the artifact suggestions system 262. Certain entities may only be allowed to access certain categorical containers, tile elements, artifact fields, and/or task blocks, while others may be able to access all or none of the artifact hierarchies. For example, the permissions management controller 266 can first approve of a mother, father, and son entity to access artifact hierarchies of the artifact suggestions system 262. The permissions management controller 266 can further designate that the father is allowed to access all artifact hierarchies, the mother is only allowed to access the family IDs, property, passwords, and taxes categorical containers (e.g., excluding money, emergency planning, estate documents categorical containers), and the son is only allowed to access the family archives categorical container.

In some implementations, the permissions management controller 266 can allow entities to grant other entities permissions to access artifact hierarchies of the artifact suggestions system 262 and set restrictions for each of the added entities. For example, a father can add a wife and son, but restrict the wife to be able to only see and submit inputs to bank account, insurance policy, and property tile elements and task blocks, while the son to only be able to see and submit inputs to college loan tile elements and artifact fields. In various implementations, the permissions management controller 266 can automatically suggest or add other entities to grant access to the artifact suggestions system. To do so, the permissions management controller 266 can evaluate what entities are specified in artifact-input data stored in artifact-input data store 304 and suggest to the administrator entity to add such additional entities, or just directly add such entities. For example, if there is artifact-input data such as a son's passport ID number, a grandfather's will, or a cousin's video/image archives, the permissions management controller 266 can suggest to the father (e.g., the administrator) to grant the son, grandfather, and cousin access to the artifact suggestions system 262.

Furthermore, the permissions management controller 266 can automatically determine the levels of access for each suggested entity, based on the nature of the entity's role in relation to the artifact hierarchies, and assign tasks for the suggested entity. For example, the permissions management controller 266 can determine that a son has access to a "children's identification information" tile element, a father and mother have access to an "add property information" to-do block, and the grandfather has access to an "elder's will" tile. The permissions management controller 266 can dynamically assign task blocks or automated notifications to different entities based on the roles of the entities, the interrelations between the entities, and/or the relation of the roles of the entities to the artifact hierarchies. For example, the permissions management controller 266 can determine that tile elements related to video game account passwords of children in the family should map to task blocks or automated notifications requesting the parents to submit the account passwords. The permissions management controller 266 can thus assign these task blocks or automated notifications to the parental entities of the family. As another example, the permissions management controller 266 can determine that the tile elements related to estate documents should map to task blocks or automated notifications requesting the mother and father to jointly submit inputs to and complete. The permissions management controller 266 can thus assign these estate document tile elements to the mother and father of the family. In some implementations, the permissions management controller 266 can enable user entities assign an incomplete artifact (e.g., missing field) to other user entities to elicit their help in completing artifacts. By allocating different roles and tasks to different entities, the permissions management controller 266 can distribute the workload of completing artifacts across multiple entities. Especially when the artifacts are associated with a number of distributed entities (e.g., a mother, father, son, grandson, grandfather, cousin, uncle, aunt), the permissions management controller 266 can help the centralized artifacts system better centralize inputs from the multiple entities and ensure proper permissions are allocated to each of the entities in a secure manner.

Figure 4:
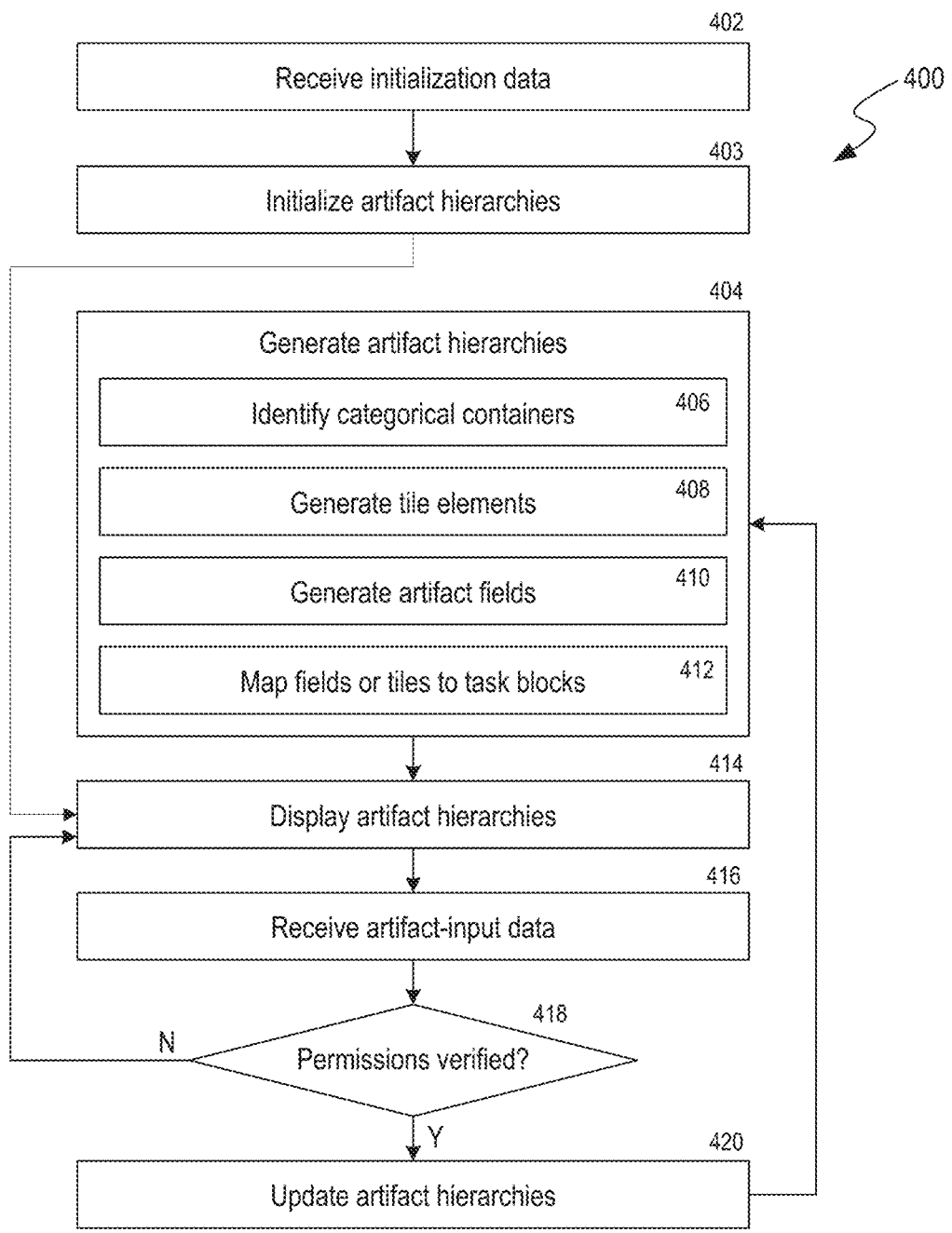
FIG. 4 is a flow diagram illustrating a process of utilizing artifact hierarchies to process artifacts in accordance with some implementations of the present technology.

FIG. 4 is a flow diagram illustrating a process 400 of utilizing artifact hierarchies to process artifacts in accordance with some implementations of the present technology. At act 402, process 400 receives initialization data. Initialization data can include user inputted data that will be used by process 400 to subsequently generate an initial set of suggested artifact hierarchies. The initialization data can be collected at onboarding time (e.g., when user entities are going though onboarding steps of the centralized artifacts system). For example, process 400 can display to user entities a graphical user interface (GUI) for submitting inputs of initialization data. The initialization data can include input submissions in response to prompts such as, the user entity's name and family name, the number of entities living in the user entity's household, the user entity's ranking of the most important features or preferences to be accounted for by process 400 (e.g., convenience, organization, preparedness, guidance, legacy), and/or the user entity's home ownership status. Convenience can refer to, e.g., organization of artifacts for easier access, organization can refer to, e.g., gathering artifacts all in one place, preparedness can refer to, e.g., giving a family a plan for emergencies, guidance can refer to, e.g., keeping the user entity better informed on what he/she should be doing to better prepare, and legacy can refer to, e.g., ensuring that the user entity's artifacts get properly passed down to subsequent generations of entities.

At act 403, process 400 initializes artifact hierarchies using the received initialization data. Process 400 can initialize the artifact hierarchies using the initialization data to generate an initial set of suggested categorical containers, tile elements, artifact fields, and/or suggested task blocks. In some implementations, process 400 can initialize the artifact hierarchies by mapping the initialization data to templates of suggested categorical containers, tile elements, artifact fields, and/or suggested task blocks. For example, when the initialization data includes inputs from the user entity specifying two or more entities living in the user entity's household, process 400 can determine that the user entity is likely in a family and suggest tile elements for each family member such as identification information, bank account information, and insurance plans, and likewise a family property information tile element. As another example, when the initialization data includes inputs from the user entity specifying that they own a house, process 400 can suggest a property categorical container with property information tile elements. As a further example, process 400 can utilize camera devices to scan a driver's license. Subsequently, process 400 can use OCR (or other equivalent techniques) to identify the home address and then use that address to extract additional information such as home ownership or tax records. Process 400 can match (or identify closest match to) the additional information to the first and last name listed on the driver's license to confirm home ownership and pre-populate related entities (e.g., entities also associated with the home, such as family members living in the home).

At act 414, process 400 displays the artifact hierarchies. Process 400 can generate a graphical representation of each of the suggested categorical containers, tile elements, artifact fields, and/or suggested task blocks. Process 400 can subsequently present the graphical representation to user entities for inputs or completion of the suggested artifact hierarchies. More details on the graphical representation of the artifact hierarchies are described below in relation to FIGS. 6A-6E.

At act 416, process 400 receives artifact-input data. The artifact-input data can be submitted inputs from user entities in response to the displayed artifact hierarchies. The artifact-input data can include submitted inputs associated with the completion of artifact fields that are displayed to the user entity. For example, the artifact-input data can include submitted inputs such as "ABC Insurance", "George", "123456", and "2 years" associated with the completion of artifact fields such as an insurance provider, person insured, policy number, and policy terms. The artifact-input data can also include submitted inputs associated with the completion of suggested task blocks that are displayed to the user entity. For example, the artifact-input data can include submitted inputs such as "1234ABCDE", an insurance policy linked/imported from an insurance provider's computer systems/servers, and a vehicle identification number imported from a government database associated with completion of modal blocks with prompts such as "Enter this car's license plate number", "select one or more insurance policies to link to this vehicle", "what is this car's VIN." In some instances, the artifact-input data can include dismissed actions, such as the dismissal of a suggested task block or artifact fields (e.g., a modal block, automated notification block, or to-do block that is not relevant to the user entity).

At act 418, process 400 verifies whether the received artifact-input data is permitted to be used in updating the artifact hierarchies. Process 400 can verify whether the received artifact-input data is submitted or completed by user entities that are permitted or not permitted to update the artifact hierarchies. In other words, process 400 can verify whether the received artifact-input data is permitted to be used in updating the artifact hierarchies. When the artifact-input data is permitted to be used in updating a categorical container, tile element, artifact fields, or task block, that means that the artifact-input data is submitted or completed by a user entity that has permissions to update the categorical container, tile element, artifact fields, or task block. When the artifact-input data is not permitted to be used in updating a categorical container, tile element, artifact fields, or task block, that means that the artifact-input data is submitted or completed by a user entity that does not have permissions to update the categorical container, tile element, artifact fields, or task block. More details on how the centralized artifacts system manages what user entities can update the artifact hierarchies are described in relation to the permissions management controller 266 of FIG. 3. Upon determining that the artifact-input data is not permitted to be used in updating the artifact hierarchies, process 400 can proceed to act 414 and continue to display the artifact hierarchies without performing any updates thereto. In other words, process 400 can continue to display the artifact hierarchies and wait for artifact-input data submitted from a user entity that is permitted to update the artifact hierarchies.

Upon determining that the artifact-input data is permitted to be used in updating the artifact hierarchies, process 400 can proceed to act 420.

At act 420, process 400 updates the artifact hierarchies using the received artifact-input data. Updates can include modifying the artifact hierarchies or generating new artifact hierarchies based on the received artifact-input data. In some implementations, process 400 can modify the categorical containers and/or tile elements using the received artifact-input data. Process 400 can modify the categorical containers and/or tile elements by changing the categorical containers, tile elements, artifact fields, and/or suggested task blocks. For instance, when the artifact-input data includes submitted inputs that specify the names of specific individuals (e.g., Joe, Jackie) in a family, process 400 can modify current tile element related to such individuals to include their names (e.g., modify "son's will" tile element to say "Joe's will" instead, or "mom's evacuation plan" tile element to say "Jackie's evacuation plan" instead). In another instance, when the artifact-input data includes a submitted input to an artifact field for a single tile element (e.g., a driver's license ID corresponding to an identification information tile element), but that artifact field is also related to other tile elements as well (e.g., the driver's license ID can also be related to a car information tile element, and a car insurance policy tile element), process 400 can modify all tile elements corresponding to that artifact field (e.g., complete the driver's license ID artifact field for the car information tile element and the car insurance policy tile element as well).

In various implementations, process 400 can generate new artifact hierarchies using the received artifact-input data. To generate new artifact hierarchies, process 400 can proceed to act 406. At act 406, process 400 identifies categorical containers for the received artifact-input data. In some instances, process 400 can identify the categorical containers by identifying preset or templates of categorical containers that correspond to certain artifact-input data obtained from user entities. For example, when artifact-input data store includes data related to multiple entities within a family, process 400 can identify and suggest family archives, family IDs, and passwords categorical containers. In various instances, the process 400 can use one or more machine learning models (e.g., models described in relation to FIG. 2 above) trained to identify the categorical containers based on artifact-input data. For example, the one or more machine learning models can be trained on training data that includes labeled/tagged pairs of artifact-input data and categorical containers (e.g., of the form {artifact-input data, categorical containers}). At test time or deployment, the one or more machine learning models can input the artifact-input data and output suggested categorical containers.

At act 408, process 400 generates tile elements for each of the identified categorical containers. In some instances, process 400 can generate the tile elements by identifying preset or templates of tile elements that correspond to certain artifact-input data obtained from user entities. For example, when artifact-input data store includes data related to a couple, process 400 can identify and suggest relevant identification information, credit card, checking account, car information, laptop password, life insurance, or will tile elements for each of the wife and husband. As another example, when a child reaches the age of 16, process 400 can prompt for a driver's license tile element from/for the child. Process 400 can also identify and suggest relevant joint tile elements for the couple (e.g., those tile elements that may be shared by the couple) such as joint checking account, family pet, family trust, home WiFi password, garage door code, homeowners insurance, family car insurance, umbrella insurance policy, joint text return, or family photos. Moreover, process 400 can identify and suggest tile elements that may be only relevant to individuals themselves, such as a jewelry tile element for one individual or a fantasy sports accounts password tile element for the other individual. In various instances, process 400 can use one or more machine learning models (e.g., models described in relation to FIG. 2 above) trained to generate tile elements based on artifact-input data. For example, the one or more machine learning models can be trained on training data that includes labeled/tagged pairs of artifact-input data and tile elements (e.g., of the form {artifact-input data, tile elements}). At test time or deployment, the one or more machine learning models can input the artifact-input data and output suggested tile elements.

At act 410, process 400 generates artifact fields for each of the generated tile elements. Each tile element can have a preset template of artifact fields that are generated when the tile element is generated. For example, a power of attorney tile element can have preset artifact fields including a digital copy attachment of the power of attorney (e.g., to import from email, cloud, local computer, or other integrated system), the date of the power of attorney, the location the power of attorney is stored (e.g., digitally and physically), and the lawyer contact information. More details on artifact fields are described above in relation to the artifact fields 312 of FIG. 3.

At act 412, process 400 maps the artifact fields or tile elements to a queue of suggested task blocks. Each artifact field can map to a suggested task block of the queue. For example, a date of power of attorney artifact field can map to an automated notification block prompting the user entity to review the power of attorney a year later to verify it is accurate and up to date. As another example, a passport number artifact field can map to a modal block prompting the user entity to fill-in a passport number, a social security photo artifact field can map to a modal block requesting the user entity attach a photo of their social security card, and a date of birth artifact field can map to a modal block with a question that prompts the user to type-in their date of birth. As a further example, the artifact fields of a tax return tile element can map to modal blocks with questions that prompt the user entity to import a previous year's return, brokerage account information, bank account information, etc. Each tile element can map to a set of task blocks of the queue. For example, a passwords tile element can map to to-do blocks including to-dos for the user entity to complete the laptop password, phone password, and WiFi password artifact fields.

In various implementations, the queue of suggested task blocks can be ordered according to a priority level of each suggested task block in the queue (e.g., the top of the queue is highest in priority, while the bottom of the queue is lowest in priority). In other words, the queue of suggested task blocks can be a priority queue. The priority level can be based on a to-do due date, a reminder date, a notification date, or any date related to the urgency of completing the suggested task block. For example, process 400 can determine that a password, visa, or an identification card (e.g. driver's license, passport) expires in a week. Accordingly, process 400 can prioritize the suggested task block associated with the password, visa, or identification card artifact fields before other suggested task blocks that are not as urgent, don't have due dates, or will not expire until after a week. As another example, process 400 can determine that suggested blocks related to tax return tile elements are more urgent and subsequently prioritize those over tile elements such as family photo albums that are less urgent.

At a second or more execution or iteration of act 414, process 400 displays the generated artifact hierarchies. Process 400 can generate a graphical representation of each of the identified categorical containers, generated tile elements, generated artifact fields, and/or mapped suggested task blocks. Process 400 can subsequently present the graphical representation to user entities for inputs or completion of the suggested artifact hierarchies. More details on the graphical representation of the artifact hierarchies are described below in relation to FIGS. 6A-6E.

At a second or more execution or iteration of act 416, process 400 receives additional artifact-input data. The additional artifact-input data can be submitted inputs from user entities in response to the generated/updated artifact hierarchies. In some instances, the additional artifact-input data at the second or more iteration of act 416 can be submitted by user entities different from the user entities of the received artifact-input data at a previous iteration (e.g., the first iteration).

At a second or more execution or iteration act 418, process 400 verifies whether the received additional artifact-input data is permitted to be used in updating the artifact hierarchies. More details on how process 400 receives and verifies the artifact-input data are described above in relation to the first execution or iteration of act 416. Upon determining that the additional artifact-input data is not permitted to be used in updating the artifact hierarchies, process 400 can proceed to act 414 and continue to display the artifact hierarchies without performing any updates thereto. In other words, process 400 can continue to display the artifact hierarchies and wait for further additional artifact-input data submitted from a user entity that is permitted to update the artifact hierarchies. Upon determining that the additional artifact-input data is permitted to be used in updating the artifact hierarchies, process 400 can proceed to act 420.

At a second or more execution or iteration of act 420, process 400 updates the artifact hierarchies using the additional artifact-input data. Updates can include using the additional artifact-input data to dequeue suggested task blocks currently on the queue of task blocks, generate new artifact hierarchies, or modify the existing artifact hierarchies. In some implementations, the additional artifact-input data can cause process 400 to dequeue suggested task blocks. For example, when the additional artifact-input data includes completions of artifact fields, modal blocks, to-do blocks, or automated notification blocks, process 400 can dequeue the corresponding suggested task blocks in the queue. Dequeuing can indicate that such task blocks are completed and no longer need to be addressed by the user entity. In some instances, process 400 can receive dismissals of artifact fields or suggested task blocks from user entities. Dismissals can be useful when user entities find the artifact fields or task blocks suggested to them to be irrelevant to their profile or state of living (e.g., prenuptial agreement when the user entity is single, life insurance when the user entity has no life insurance), or when user entities simply just do not want to provide any information for the artifact field or task block (e.g., does not feel comfortable sharing their passport number with the system). Accordingly, process 400 can allow user entities to indicate to the centralized artifacts system that such suggestions are irrelevant and dismiss the suggestions. When the additional artifact-input data includes dismissals of artifact fields, modal blocks, to-do blocks, or automated notification blocks, process 400 can proceed to dequeue the corresponding suggested task blocks in the queue. Dequeuing can indicate that such task blocks are dismissed and no longer need to be addressed by the user entity.

In some implementations, process 400 can generate new artifact hierarchies using the additional artifact-input data. Such newly generated artifact hierarchies can include new categorical containers, tile elements, artifact fields, and/or suggested task blocks. More details on how process 400 can generate new artifact hierarchies are described above in relation to the first execution or iteration of act 410. Process 400 can subsequently update the queue of suggested task blocks with new suggested task blocks associated with new artifact fields generated. For example, process 400 can add or enqueue the new suggested task blocks to the queue of suggested task blocks based on the priority of the new task blocks in relation to the current task blocks on the queue.

In various implementations, process 400 can modify the categorical containers, tile elements, artifact fields, and/or task blocks using the received artifact-input data. In some instances, process 400 can modify tile elements by checking for consistency between the information submitted different tile elements with similar artifact fields or suggested task blocks. For example, process 400 can determine that a driver's license number artifact field for an identification information tile element is different from that of other tile elements specifying the driver's license number for the same user entity. In such circumstances, process 400 can modify the driver's license number artifact field for the identification information tile element to be consistent with the driver's license number of other tile elements or alert user entities of the discrepancy.

In another instance, process 400 can modify categorical containers and/or tile elements using artifact-input data that includes global update data. Global update data can be data, relevant to updating the tile elements or artifact fields, that is obtained from other distributed systems integrated with the centralized artifacts system (e.g., financial institution servers, government databases, healthcare provider cloud records, insurance provider online systems, local devices, social media, news report sources, etc.). Global update data can also be data derived from regulation/societal changes, such as updates to identification requirements, legal changes with insurance policies, new regulations established for bank accounts, business policy changes with healthcare providers, rate changes from taxation institutions, requirements to update account passwords, new governmental department requirements, or changes from private institutions linked to or integrated with the centralized artifacts system. Global update data can additionally include valuation changes to property or items owned by user entities, such as automobile values, home values, or bank account balances.

Process 400 can use global update data to optimize the different artifact hierarchies by keeping user entities up to date once their artifact-input data is in the centralized artifacts system and by filling in missing components over time. As an example, process 400 can determine from global update data obtained from a government database that indicates a passport is expiring soon, or the taxes for this year must be completed before a certain date. Process 400 can subsequently modify the suggested task block for passport information and the suggested task block for completing tax returns to have to-do due dates or automated notifications before the certain dates. As another example, process 400 can determine from global update data obtained from a healthcare provider that has a vaccination date of the user entity different from the vaccination date artifact field associated with a vaccination tile element. Process 400 can subsequently modify the vaccination date artifact field to instead be the vaccination date obtained from the healthcare provider. As a further example, process 400 can determine from global update data obtained from insurance agencies that the rates for home insurance are changing or going down. Process 400 can subsequently modify the insurance categorical container to map home insurance rate artifact fields to automated notification blocks or to-do blocks suggesting the user entity shop around for better insurance rates.

Upon modifying the categorical containers tile elements, artifact fields, and/or task blocks, process 400 can update the queue of suggested task blocks with the modified suggested task blocks associated with the modified artifact fields.

Figure 5:
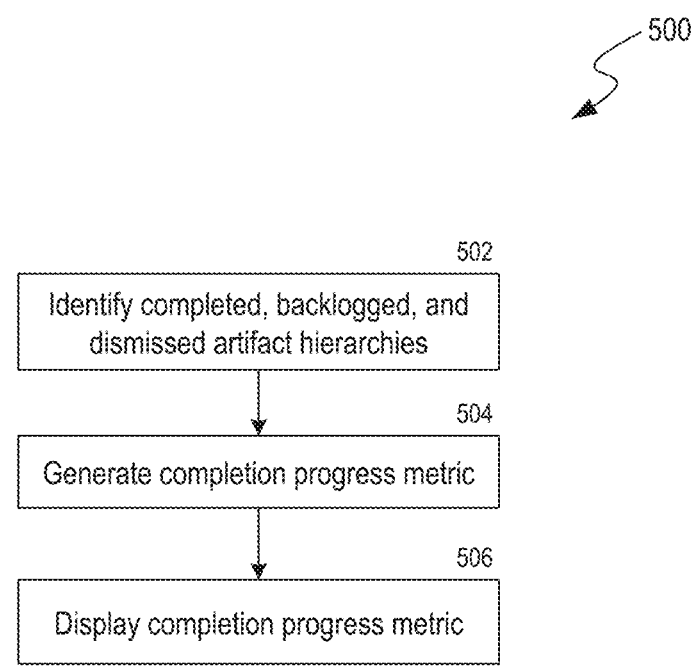
FIG. 5 is a flow diagram illustrating a process of generating completion progress metrics in accordance with some implementations of the present technology.

FIG. 5 is a flow diagram illustrating a process 500 of generating completion progress metrics in accordance with some implementations of the present technology. At act 502, process 500 identifies completed, backlogged, and dismissed artifact hierarchies. Completed artifact hierarchies can include categorical containers, tile elements, and artifact-fields that have been completed or fully filled-in by user entities. Completed artifact hierarchies can also include completed task blocks (e.g., to-do blocks that are done, automated notification blocks that have been addressed, modal blocks that have been answered), which can be blocks that have been dequeued from the queue of suggested task blocks. Dismissed artifact hierarchies can include categorical containers, tile elements, and artifact-fields that have been dismissed by user entities. Dismissed artifact hierarchies can also include dismissed task blocks, which can also be blocks that have been dequeued from the queue of suggested task blocks. Accordingly, process 500 can identify blocks that have been dequeued from the queue of suggested task blocks as completed or dismissed blocks. Backlogged artifact hierarchies can include categorical containers, tile elements, artifact fields that have not been completed and are still pending completion or fill-in by user entities. Backlogged artifact hierarchies can also be blocks that are still currently on the queue of suggested task blocks. Process 500 can identify the blocks that are currently on the queue of suggested task blocks as backlogged blocks.

At act 504, process 500 generates a completion progress metric using the identified completed, backlogged, and dismissed artifact hierarchies. Process 500 can, for example, use the completed or dismissed blocks and the backlogged blocks to generate the completion progress metric. The completion progress metric can show the real-time completion progress of the artifact hierarchies by the user entity. In some implementations, the completion progress metric can be a progress meter formula of the form:

$$\frac{\text{number of completed blocks} + \text{number of dismissed blocks}}{\text{number of completed blocks} + \text{number of dismissed blocks} + (\text{number of backlogged blocks} \times \text{weight})}$$

The weight can be a value dependent on the number of completed and dismissed blocks. For example, when the number of completed and dismissed blocks is at least 100, the weight can be equal to 2, while when the number of completed and dismissed blocks is under 100, the weight can be equal to 4. Using a progress meter formula of this form can indicate more progress when user entities first begin submitting inputs and complete artifact hierarchies, while slowing down the progress as user entities have filled out more and more artifact hierarchies and approach full completion. This can give user entities a greater sense of accomplishment and motivate them to submit more and more inputs to the centralized artifacts system so that they can continue to see the completion progress metric go up.

In some implementations, process 500 can also determine a participation level of user entities of the centralized artifacts system. The participation level can be the number of clicks or selections of artifact hierarchies by user entities. Process 500 can further use the participation level in generating the completion progress metric. In other words, process 500 can factor in the participation level of user entities when generating the completion progress metric. User entities with higher participation levels can correspond to higher magnitudes of completion progress metrics, while user entities with lower participation levels can correspond to lower magnitudes of completion progress metrics.

At act 506, process 500 displays the generated completion progress metric. Process 500 can generate a graphical representation of the completion progress metric as a visual guide (e.g., percent completion progress bar, percentage numerical value, proportion value, graph or plot over time) showing real-time completion. Process 500 can subsequently present the graphical representation to user entities to give them a good sense of what they have done and what they can do more of. More details on the graphical representation of the completion progress metric are described below in relation to FIG. 6E.

Figure 6A:
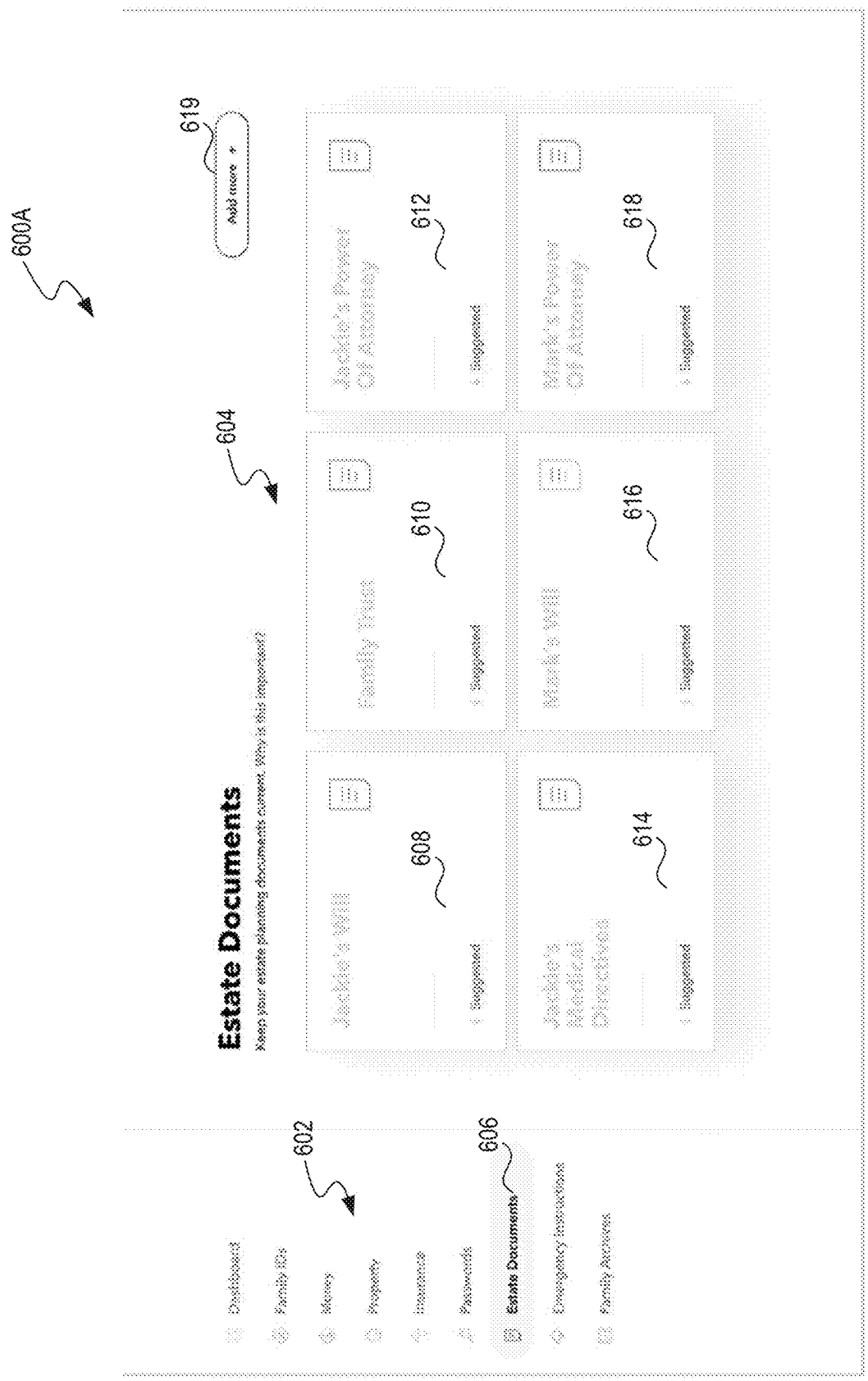
FIGS. 6A-E are conceptual diagrams illustrating examples of graphical representations of artifact hierarchies in accordance with some implementations of the present technology.

FIGS. 6A-E are conceptual diagrams illustrating examples 600A-600D of graphical representations of artifact hierarchies in accordance with some implementations of the present technology. FIG. 6A is a conceptual diagram illustrating an example 600A of graphical representations of categorical containers and tile elements as graphical user interface (GUI) elements 602 and GUI elements 604, respectively. The GUI elements 602 of the categorical containers (e.g., family IDs, Money, Property, Insurance, Passwords, Estate Documents, Emergency Instructions, Family Archives) includes a GUI element 606 representing an estate documents categorical container. The estate documents categorical container include tile elements such as Jackie's Will, Family Trust, Jackie's Power of Attorney, Jackie's Medical Directives, Mark's Will, and Mark's Power of Attorney that are represented by GUI elements 608, 610, 612, 614, 616, and 618, respectively. Using the methodologies described in relation to FIGS. 3-4, the centralized artifacts system can generate the categorical containers 602 and tile elements 604, and obtain inputs that complete them from user entities. Example 600A shows the generated categorical containers 602 and tile elements 604 presented and suggested to the user entities Jackie and Mark for completion. Example 600A also includes a GUI element 619 that user entities can click or select to manually add more tile elements under the estate documents categorical container 606.

Figure 6B:

FIG. 6B is a conceptual diagram illustrating an example 600B of graphical representations of artifact fields as GUI elements 632-660. Example 600B includes artifacts and artifact fields of an identification information tile element for the user entity 666 "Jackie Brown." Example 600B includes artifacts such as social security, a driver's license, a USA passport, a German passport, and a birth certificate represented graphically as the GUI elements 622, 624, 626, 628, and 630, respectively. The social security artifact includes completed artifact fields such as a picture of the social security card and the social security number represented graphically as the GUI elements 632 and 634, respectively. The driver's license artifact includes completed artifact fields such as a picture of the driver's license, driver's license number, a state issued, and an expiration date represented graphically as the GUI elements 636, 638, 640, and 642, respectively. The USA passport artifact includes completed artifact fields such as a picture of the USA passport, passport number, country issued, and expiration date represented graphically as the GUI elements 644, 646, 648, and 650, respectively. The German passport artifact includes completed artifact fields such as a picture of the German passport, passport number, and country issued, represented graphically as the GUI elements 652, 654, 656, respectively. The German passport artifact can also include an expiration date artifact field, to be completed by the user entity 666, represented by GUI element 658. The birth certificate artifact includes a picture of the birth certificate represented graphically as the GUI element 660. Example 600B also includes a GUI element 668 that the user entity 666 can click or select to manually add additional identification artifacts and artifact fields. Using the methodologies described in relation to FIGS. 3-4, the centralized artifacts system can generate the artifact fields 632-660 and obtain inputs that complete the artifact fields from user entities. Example 600A shows the generated artifact fields 632-660 presented and suggested to the user entity 666 for completion. Example 600B further includes a GUI element 670 to delete the identification information tile element.

Figure 6C:
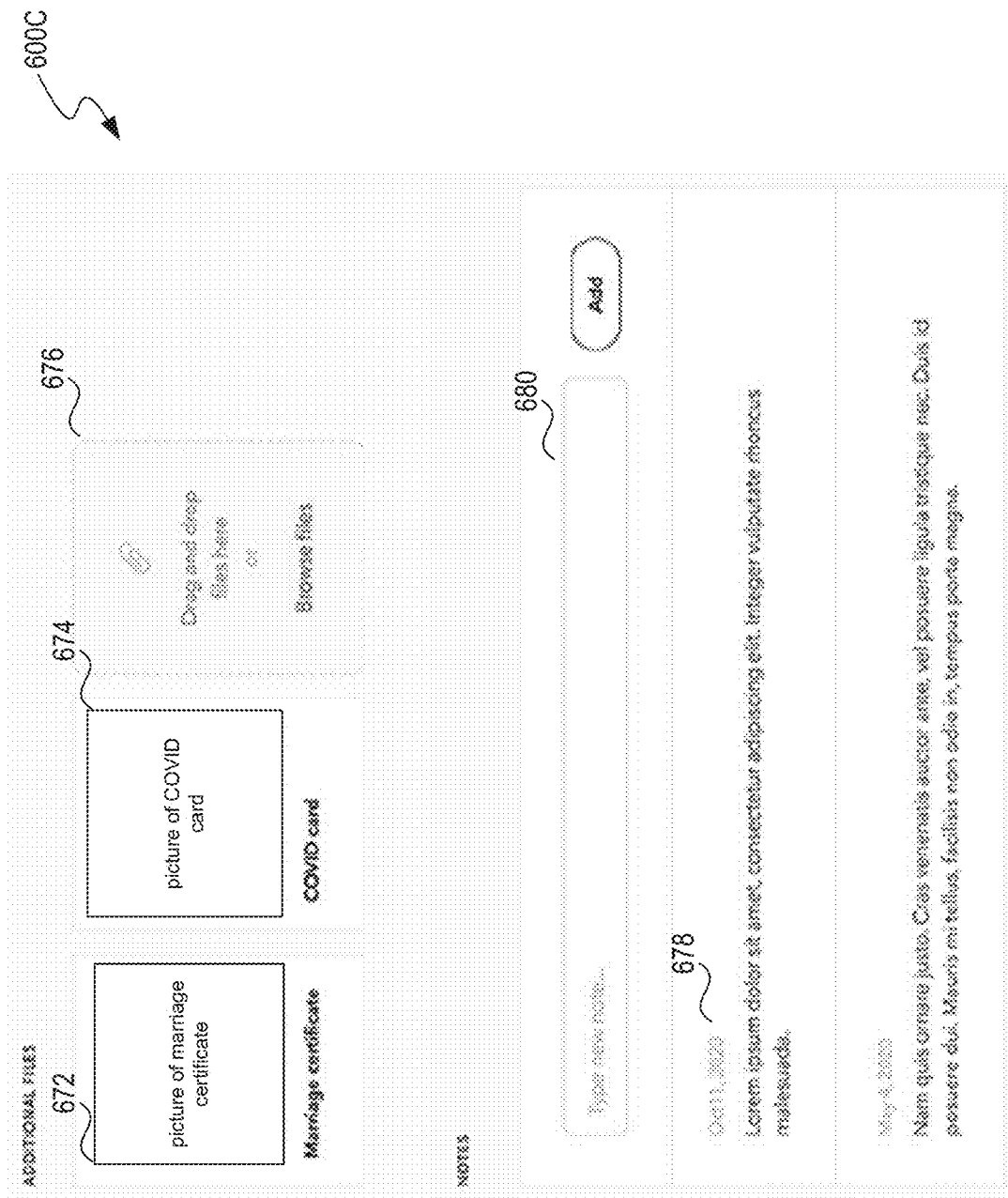

FIG. 6C is a conceptual diagram illustrating an example 600C of graphical representations of additional artifact fields as GUI elements 672-680. Example 600C includes additional artifact fields (e.g., additional files, notes) that can be added to any tile element. In particular, example 600C includes completed additional artifact fields such as a picture of a marriage certificate, a picture of a COVID card, and a note dated Oct. 11, 2020 represented graphically as the GUI elements 672, 674, and 678, respectively. Example 600C also includes a GUI element 676 that user entities can click or select to add additional files from a local device, another distributed system, or any other platform integrated with the system. Example 600C further includes a GUI element 680 that user entities can click or select to type new notes and submit as inputs. Using the methodologies described in relation to FIGS. 3-4, the centralized artifacts system can generate the additional artifact fields 672-678 and obtain inputs that complete or dismiss the artifact fields from user entities.

Figure 6D:
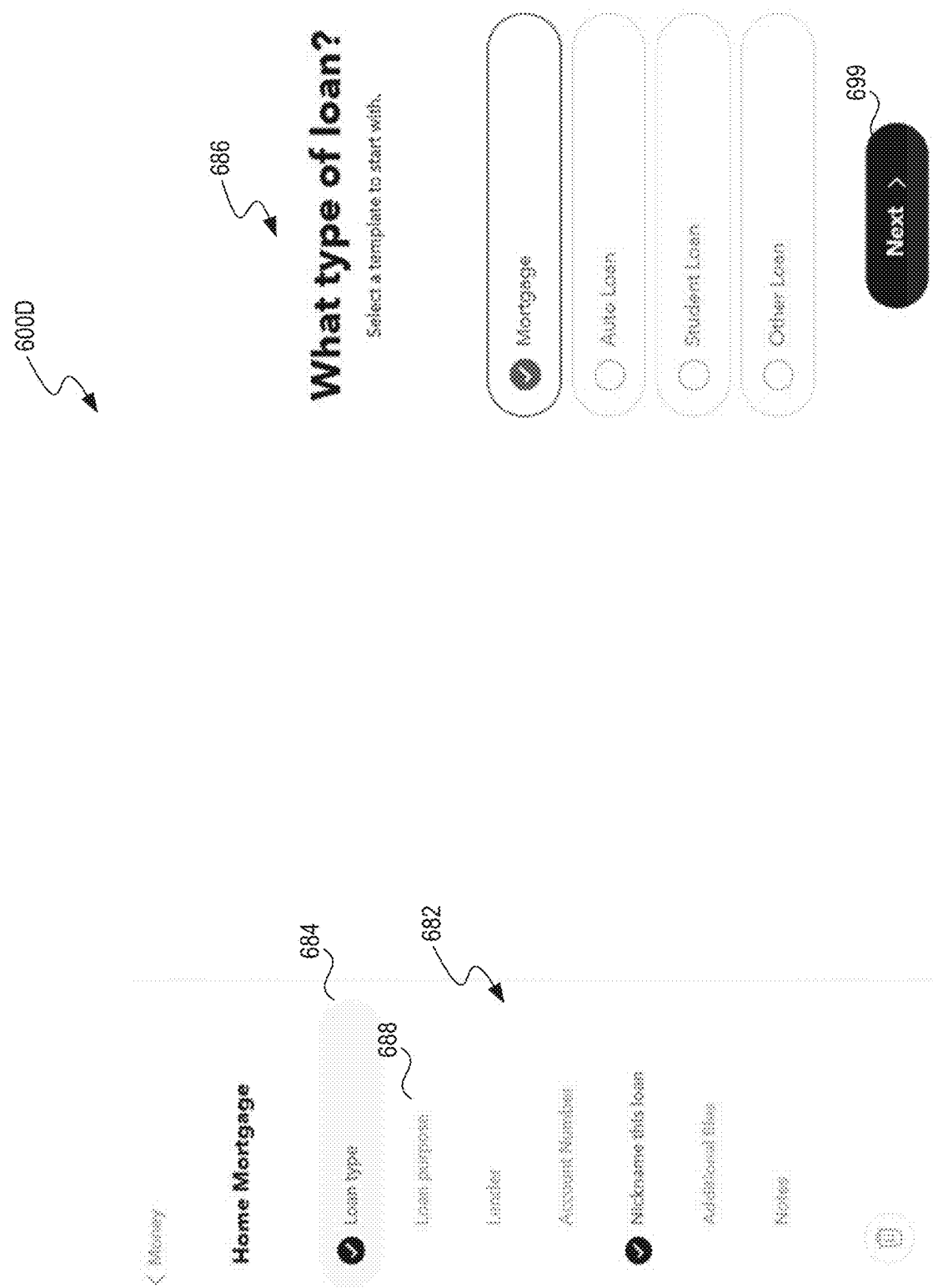

FIG. 6D is a conceptual diagram illustrating an example 600D of a graphical representation of modal block as a GUI element 686. Example 600D includes GUI elements 682 representing artifact fields (e.g., loan type, loan purpose, lender, account number, nickname this loan, additional files, notes). The GUI elements 682 include the GUI element 684 representing a loan type artifact field mapped to a completed task block and a GUI element 688 representing a loan purpose artifact field mapped to a backlogged task block. The loan type artifact field can be mapped to the modal block represented graphically as the GUI element 686. The modal block 686 includes a prompt regarding what type of loan the user entity is inputting (e.g., mortgage), and a GUI element 699 that when clicked or selected, dequeues the modal block 686 and displays the next task block currently on the queue of suggested task blocks. Using the methodologies described in relation to FIGS. 3-4, the centralized artifacts system can generate the modal block 686 and obtain from user entities inputs that complete or dismiss the modal block.

Figure 6E:
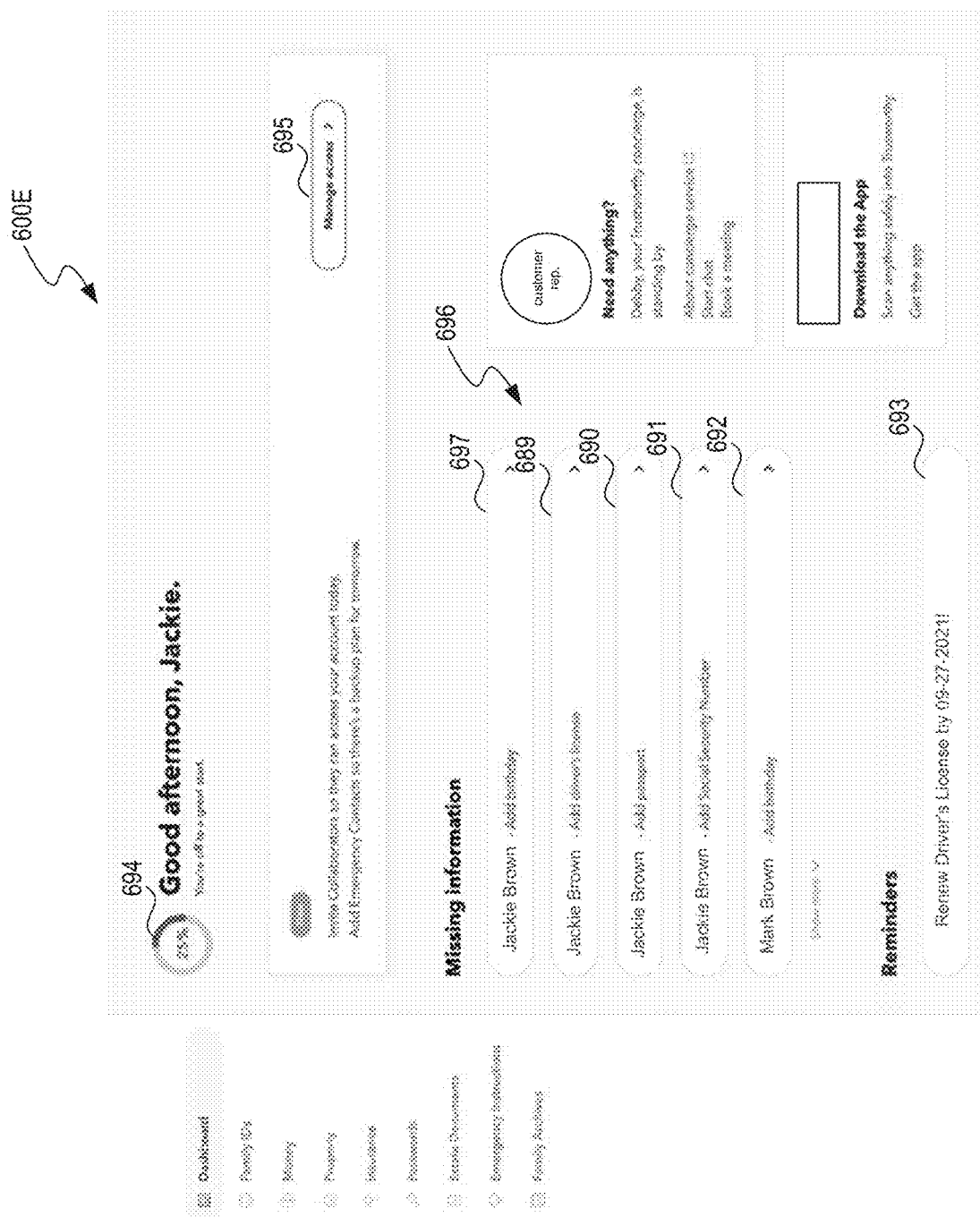

FIG. 6E is a conceptual diagram illustrating an example 600E of a graphical representation of to-do blocks as GUI elements 696 and an automated notification block as a GUI element 693. The GUI elements 696 include GUI elements 697, 689, 690, 691, and 692 that represent to-do blocks that prompt the user to add a birthday for Jackie Brown, add a driver's license for Jackie Brown, add a passport for Jackie Brown, add a social security number for Jackie Brown, and add a birthday for Mark Brown, respectively. The GUI element 693 represents an automated notification block notifying the user entity Jackie to renew their license by Sep. 27, 2021. Using the methodologies described in relation to FIGS. 3-4, the centralized artifacts system can map the to-do blocks 697, 689, 690, 691, and automated notification block 693 from artifact fields, and obtain inputs that complete them or dismiss them from user entities. Example 600E also includes a graphical representation of a completion progress metric as a GUI element 694. Using the methodologies described in relation to FIG. 5, the centralized artifacts system can generate the completion progress metric and present it to the user entity as an indication of their current progress in completing the suggested artifact hierarchies (e.g., 25% of artifact hierarchies completed). Example 600E further includes a GUI element 695 that when clicked or selected, allows the user entity Jackie to manage user entity permissions of the centralized artifacts system using the permissions management controller 266 of FIG. 3.

CONCLUSION

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above Detailed Description of examples of the technology is not intended to be exhaustive or to limit the technology to the precise form disclosed above. While specific examples for the technology are described above for illustrative purposes, various equivalent modifications are possible within the scope of the technology, as those skilled in the relevant art will recognize. For example, while processes or blocks are presented in a given order, alternative implementations may perform routines having steps, or employ systems having blocks, in a different order, and some processes or blocks may be deleted, moved, added, subdivided, combined, and/or modified to provide alternative or sub-combinations. Each of these processes or blocks may be implemented in a variety of different ways. Also, while processes or blocks are at times shown as being performed in series, these processes or blocks may instead be performed or implemented in parallel, or may be performed at different times. Further, any specific numbers noted herein are only examples: alternative implementations may employ differing values or ranges.

The teachings of the technology provided herein can be applied to other systems, not necessarily the system described above. The elements and acts of the various examples described above can be combined to provide further implementations of the technology. Some alternative implementations of the technology may include not only additional elements to those implementations noted above, but also may include fewer elements.

These and other changes can be made to the technology in light of the above Detailed Description. While the above description describes certain examples of the technology, and describes the best mode contemplated, no matter how detailed the above appears in text, the technology can be practiced in many ways. Details of the system may vary considerably in its specific implementation, while still being encompassed by the technology disclosed herein. As noted above, specific terminology used when describing certain features or aspects of the technology should not be taken to imply that the terminology is being redefined herein to be restricted to any specific characteristics, features, or aspects of the technology with which that terminology is associated. In general, the terms used in the following claims should not be construed to limit the technology to the specific examples disclosed in the specification, unless the above Detailed Description section explicitly defines such terms. Accordingly, the actual scope of the technology encompasses not only the disclosed examples, but also all equivalent ways of practicing or implementing the technology under the claims.

To reduce the number of claims, certain aspects of the technology are presented below in certain claim forms, but the applicant contemplates the various aspects of the technology in any number of claim forms. For example, while only one aspect of the technology is recited as a computer-readable medium claim, other aspects may likewise be embodied as a computer-readable medium claim, or in other forms, such as being embodied in a means-plus-function claim. Any claims intended to be treated under 35 U.S.C. § 112(f) will begin with the words "means for," but use of the term "for" in any other context is not intended to invoke treatment under 35 U.S.C. § 112(f). Accordingly, the applicant reserves the right to pursue additional claims after filing this application to pursue such additional claim forms, in either this application or in a continuing application.

We claim:

1. A computer-implemented method comprising:
    receiving a first set of artifact input data associated with artifacts of distributed entities;
    identifying categorical containers for the received first set of artifact input data, wherein the categorical containers categorize artifacts;
    generating, for each of the identified categorical containers, tile elements each including a set of artifact fields generated to constitute an artifact of the distributed entities;
    mapping the set of artifact fields to a queue of suggested task blocks, wherein each artifact field of the set of artifact fields maps to a suggested task block of the queue of suggested task blocks;
    generating for display, on a user-interface, a graphical representation of the suggested task blocks;

receiving a second set of artifact input data to cause at least one of the suggested task blocks of the queue of suggested task blocks to be dequeued, wherein the second set of artifact input data are associated with a completion of the artifact fields of the at least one of the suggested task blocks;

verifying, by a permissions management controller, the received second set of artifact input data is permitted to be used in updating the categorical containers and/or the tile elements;

upon verifying the second set of artifact input data is permitted, using the second set of artifact input data to:
(1) modify the categorical containers and/or the tile elements, the modified tile elements each including a modified set of artifact fields; and
(2) generate, for each of the categorical containers, new tile elements each including a new set of artifact fields, each artifact field constituting a new artifact; and updating the queue of suggested task blocks with the modified set of artifact fields and the new set of artifact fields.

2. The method of claim 1, further comprising:
identifying blocks that have been dequeued from the queue of suggested task blocks as completed or dismissed blocks;
identifying blocks currently on the queue of suggested task blocks as backlogged blocks; and
using the completed or dismissed blocks, and the backlogged blocks, generating a completion progress metric.

3. The method of claim 2, further comprising:
determining a participation level of at least one of the distributed entities,
wherein generating the completion progress metric further uses the participation level of the at least one of the distributed entities; and
generating for display, on the user-interface, a graphical representation of the completion progress metric.

4. The method of claim 1, wherein the second set of artifact input data includes global update data,
the method further comprising:
using the global update data, further modifying the categorical containers and/or the tile elements; and
updating the queue of suggested tasks blocks with the further modified tile elements.

5. The method of claim 1, wherein the queue of suggested task blocks is ordered according to a priority level of each suggested task block in the queue.

6. The method of claim 1, wherein the first set of artifact input data comprises initialization data.

7. The method of claim 1, wherein the first set of artifact input data is received from a first entity of the distributed entities,
wherein the second set of artifact input data is received from a second entity of the distributed entities, and
wherein the first entity is different from the second entity.

8. The method of claim 1, wherein the queue of suggested task blocks comprises one or more of: a modal block, a to-do block, and/or an automated notification block.

9. The method of claim 1, further comprising:
generating for display, on the user-interface, a graphical representation of one or more of the following artifact hierarchies:
(1) the categorical containers;
(2) the tile elements;
(3) the set of artifact fields; and/or
(4) the queue of suggested task blocks.

10. The method of claim 1, wherein the categorical containers comprise one or more of: identification information, financials, property information, insurance policies, taxes, passwords, estate documents, emergency plans, and/or family archives.

11. The method of claim 1, wherein the first or second set of artifact input data comprises one or more of: textual inputs, numerical inputs, documents, file attachments, image data records, video data records, and/or biometrics.

12. The method of claim 1, wherein the tile elements comprise one or more of: identification artifacts, mortgage artifacts, bank account artifacts, retirement account artifacts, bank card artifacts, loan artifacts, home artifacts, vehicle artifacts, jewelry artifacts, artwork artifacts, computer security artifacts, network security artifacts, password security artifacts, insurance artifacts, medical artifacts, tax return artifacts, trust artifacts, will artifacts, power of attorney artifacts, medical directives artifacts, evacuation plan artifacts, go-bag artifacts, fire extinguisher artifacts, letter artifacts, family tree artifacts, image artifacts, and/or video artifacts.

13. A computer-readable media storing non-transitory computer executable instructions that when executed cause a computing system to perform a method, the method comprising:
receiving a first set of artifact input data associated with artifacts of distributed entities;
identifying categorical containers for the received first set of artifact input data, wherein the categorical containers categorize artifacts;
generating, for each of the identified categorical containers, tile elements each including a set of artifact fields generated to constitute an artifact of the distributed entities;
mapping the set of artifact fields to a queue of suggested task blocks, wherein each artifact field of the set of artifact fields maps to a suggested task block of the queue of suggested task blocks;
generating for display, on a user-interface, a graphical representation of the suggested task blocks;
receiving a second set of artifact input data to cause at least one of the suggested task blocks of the queue of suggested task blocks to be dequeued, wherein the second set of artifact input data are associated with a completion of the artifact fields of the at least one of the suggested task blocks;
verifying, by a permissions management controller, the received second set of artifact input data is permitted to be used in updating the categorical containers and/or the tile elements;
upon verifying the second set of artifact input data is permitted, using the second set of artifact input data to:
(1) modify the categorical containers and/or the tile elements, the modified tile elements each including a modified set of artifact fields; and
(2) generate, for each of the categorical containers, new tile elements each including a new set of artifact fields, each artifact field constituting a new artifact; and
updating the queue of suggested task blocks with the modified set of artifact fields and the new set of artifact fields.

14. The computer-readable media of claim 13, wherein the method further comprises:
identifying blocks that have been dequeued from the queue of suggested task blocks as completed or dismissed blocks;

identifying blocks currently on the queue of suggested task blocks as backlogged blocks; and using the completed or dismissed blocks, and the backlogged blocks, generating a completion progress metric.

15. The computer-readable media of claim 14, wherein the method further comprises:

determining a participation level of at least one of the distributed entities, wherein generating the completion progress metric further uses the participation level of the at least one of the distributed entities; and generating for display, on the user-interface, a graphical representation of the completion progress metric.

16. The computer-readable media of claim 13, wherein the second set of artifact input data includes global update data, wherein the method further comprises:

using the global update data, further modifying the categorical containers and/or the tile elements; and updating the queue of suggested tasks blocks with the further modified tile elements.

17. A system comprising:

at least one processor;

at least one memory coupled to the at least one processor and storing instructions that, when executed by the at least one processor, perform operations comprising:

receiving a first set of artifact input data associated with artifacts of distributed entities;

identifying categorical containers for the received first set of artifact input data, wherein the categorical containers categorize artifacts;

generating, for each of the identified categorical containers, tile elements each including a set of artifact fields generated to constitute an artifact of the distributed entities;

mapping the set of artifact fields to a queue of suggested task blocks, wherein each artifact field of the set of artifact fields maps to a suggested task block of the queue of suggested task blocks;

generating for display, on a user-interface, a graphical representation of the suggested task blocks;

receiving a second set of artifact input data to cause at least one of the suggested task blocks of the queue of suggested task blocks to be dequeued, wherein the second set of artifact input data are associated with a completion of the artifact fields of the at least one of the suggested task blocks;

verifying, by a permissions management controller, the received second set of artifact input data is permitted to be used in updating the categorical containers and/or the tile elements;

upon verifying the second set of artifact input data is permitted, using the second set of artifact input data to:

(1) modify the categorical containers and/or the tile elements, the modified tile elements each including a modified set of artifact fields; and (2) generate, for each of the categorical containers, new tile elements each including a new set of artifact fields, each artifact field constituting a new artifact; and updating the queue of suggested task blocks with the modified set of artifact fields and the new set of artifact fields.

18. The system of claim 17, wherein the queue of suggested task blocks is ordered according to a priority level of each suggested task block in the queue.

19. The system of claim 17, wherein the first set of artifact input data comprises initialization data.

20. The system of claim 17, wherein the first set of artifact input data is received from a first entity of the distributed entities, wherein the second set of artifact input data is received from a second entity of the distributed entities, and wherein the first entity is different from the second entity.

* * * * *